(12) United States Patent
Hanebutte et al.

(10) Patent No.: US 10,169,047 B2
(45) Date of Patent: Jan. 1, 2019

(54) COMPUTING DEVICES, METHODS, AND STORAGE MEDIA FOR A SENSOR LAYER AND SENSOR USAGES IN AN OPERATING SYSTEM-ABSENT ENVIRONMENT

(71) Applicants: Intel Corporation, Santa Clara, CA (US); Ulf R. Hanebutte, Gig Harbor, WA (US); Jiewen Yao, Shanghai (CN); Vincent J. Zimmer, Federal Way, WA (US)

(72) Inventors: Ulf R. Hanebutte, Gig Harbor, WA (US); Jiewen Yao, Shanghai (CN); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 131 days.

(21) Appl. No.: 14/776,619

(22) PCT Filed: Jun. 24, 2014

(86) PCT No.: PCT/CN2014/080587
§ 371 (c)(1),
(2) Date: Sep. 14, 2015

(87) PCT Pub. No.: WO2015/196347
PCT Pub. Date: Dec. 30, 2015

(65) Prior Publication Data
US 2016/0216974 A1    Jul. 28, 2016

(51) Int. Cl.
*G06F 1/00* (2006.01)
*G06F 9/4401* (2018.01)
(Continued)

(52) U.S. Cl.
CPC .......... *G06F 9/4401* (2013.01); *G06F 21/575* (2013.01); *G06F 21/62* (2013.01)

(58) Field of Classification Search
CPC ....... G06F 9/4401; G06F 21/575; G06F 21/62
(Continued)

(56) References Cited

U.S. PATENT DOCUMENTS 7,844,866 B2    11/2010    Austen et al.
8,271,202 B1    9/2012    Fernandez
(Continued)

FOREIGN PATENT DOCUMENTS

CN    1445668 A    10/2003
CN    101311899 A    11/2008
(Continued)

OTHER PUBLICATIONS

International Search Report and Written Opinion dated Mar. 23, 2015 for International Application No. PCT/CN2014/080587, 13 pages.
(Continued)

*Primary Examiner* — Aurel Prifti (57) ABSTRACT

Computing devices, computer-readable storage media, and methods associated with providing an operating system (OS)-absent firmware sensor layer to support a boot process are disclosed. A computing device may include a processor and firmware to be operated on the processor. The firmware may include one or more modules and a sensor layer. The sensor layer may be configured to receive, in the OS-absent environment, sensor data produced by a plurality of sensors. The sensor layer may be further configured to selectively provide the sensor data to the one or more modules via an interface of the sensor layer that abstracts the plurality of sensors.

23 Claims, 6 Drawing Sheets

(51) Int. Cl.
*G06F 21/57* (2013.01)
*G06F 21/62* (2013.01)

(58) Field of Classification Search
USPC ............... 341/20; 714/56; 718/100; 706/12; 713/2
See application file for complete search history.

(56) References Cited

U.S. PATENT DOCUMENTS

| | | | |
|---|---|---|---|
| 9,141,803 B2* | 9/2015 | Klyuchevskyy | G06F 21/575 |
| 9,519,306 B2* | 12/2016 | Kishiro | H04Q 9/04 |
| 9,575,791 B2* | 2/2017 | Martinez | G06F 9/4401 |
| 2005/0285789 A1* | 12/2005 | Velhal | G01S 5/0221 |
| | | | 342/450 |
| 2005/0289403 A1* | 12/2005 | Rothman | G06F 3/023 |
| | | | 714/56 |
| 2006/0150183 A1* | 7/2006 | Chinya | G06F 9/45533 |
| | | | 718/100 |
| 2008/0046546 A1 | 2/2008 | Parmar et al. | |
| 2008/0294295 A1* | 11/2008 | Chiu | G05D 23/1919 |
| | | | 700/299 |
| 2009/0184849 A1* | 7/2009 | Nasiri | A63F 13/211 |
| | | | 341/20 |
| 2009/0241182 A1* | 9/2009 | Jaber | G06F 21/31 |
| | | | 726/16 |
| 2011/0103583 A1* | 5/2011 | Yoon | H04L 9/302 |
| | | | 380/255 |
| 2011/0215952 A1* | 9/2011 | Aria | G06F 3/017 |
| | | | 341/20 |
| 2012/0214515 A1* | 8/2012 | Davis | H04W 4/023 |
| | | | 455/456.3 |
| 2012/0254878 A1 | 10/2012 | Nachman et al. | |
| 2012/0260323 A1* | 10/2012 | San Vicente | A61B 5/002 |
| | | | 726/6 |
| 2013/0159223 A1* | 6/2013 | Bahl | G06N 5/04 |
| | | | 706/12 |
| 2013/0227261 A1* | 8/2013 | Anderson | G06F 9/4401 |
| | | | 713/2 |
| 2013/0238535 A1* | 9/2013 | Leppanen | H04W 4/025 |
| | | | 706/12 |
| 2014/0153724 A1* | 6/2014 | Kim | H04L 63/0428 |
| | | | 380/270 |
| 2016/0061469 A1* | 3/2016 | Albonesi | H02J 3/14 |
| | | | 700/276 |
| 2016/0198018 A1* | 7/2016 | Choi | H04W 8/22 |
| | | | 370/329 |
| 2017/0060574 A1* | 3/2017 | Malladi | G06F 9/54 |

FOREIGN PATENT DOCUMENTS

| | | |
|---|---|---|
| CN | 103221919 A | 7/2013 |
| JP | 2014509765 | 4/2014 |
| WO | WO 2011103652 A1 | 9/2011 |
| WO | WO2013/126411 A1 | 8/2013 |
| WO | WO2014/043056 A1 | 3/2014 |
| WO | WO2014/063330 A1 | 5/2014 |

OTHER PUBLICATIONS

Partial Supplementary European Search Report dated Jan. 31, 2018 for European Patent Application No. 14895738.4, 16 pages.
Srividya G. Kedlaya et al., "Design and Implementation of GPIO Enumeration Library and Application for UEFI-BIOS", International Journal of Scientific Engineering and Technology, May 1, 2014, pp. 524-528.
Office Action dated Dec. 19, 2017 for Japanese Patent Application No. 2016-567585, 4 pages.
Office Action dated Dec. 4, 2017 for Korean Patent Application No. 10-2016-7032443, 9 pages.
Extended European Search Report dated May 3, 2018 for European Patent Application No. 14895738.4, 12 pages.
Srividya G Kedlaya et al., "Design and Implementation of GPIO Enumeration Library and Application for UEFI-BIOS", May 1, 2014, 5 pages, International Journal of Scientific Engineering and Technology, vol. No. 3, Issue No. 5.

* cited by examiner

Non-transitory computer-readable storage medium
702

Programming Instruction 704
configured to cause a computing device, in response to execution of the programming instructions, to practice one or more operations of the methods described in reference to Figures 1-5.

FIG. 7 ial Application No. PCT/CN2014/080587, filed Jun. 24, 2014, entitled "FIRMWARE SENSOR LAYER", which designated, among the various States, the United States of America. The Specification of the PCT/CN2014/080587 Application is hereby fully incorporated by reference.

COMPUTING DEVICES, METHODS, AND STORAGE MEDIA FOR A SENSOR LAYER AND SENSOR USAGES IN AN OPERATING SYSTEM-ABSENT ENVIRONMENT

CROSS REFERENCE TO RELATED APPLICATIONS

The present application is a national phase entry under 35 U.S.C. § 371 of International Application No. PCT/CN2014/080587, filed Jun. 24, 2014, entitled "FIRMWARE SENSOR LAYER", which designated, among the various States, the United States of America. The Specification of the PCT/CN2014/080587 Application is hereby fully incorporated by reference.

TECHNICAL FIELD

Embodiments of the present disclosure are related to the field of computing devices, and in particular, to providing firmware sensor support for operating system-absent operation of the computing device.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Virtually all computing devices go through a booting (initialization) process during power on or reset. Typically, during the booting (initialization) process, a power-on self-test is performed, and then peripheral devices are located and initialized, ending with the loading and starting of an operating system. Modern computing platforms contain an abundance of sensors that may continuously collect sensor information. Under the current state of the art, however, the sensor information is accessible only through a sensor layer of an operating system of the computing device. As such, usage of sensor data during the boot process of a computing device, or on a computing device without an operating system, is not available.

DETAILED DESCRIPTION OF ILLUSTRATIVE EMBODIMENTS

Computing devices, methods, and storage media for a sensor layer and sensor usages in an operating system (OS)-absent environment are disclosed herein. In embodiments, a computing device may have a firmware sensor layer configured to receive sensor data produced by a variety of sensors, including during OS-absent operation, such as a boot process of the computing device or in an OS-absent operational mode. The firmware sensor layer may selectively provide the sensor data to one or more usage modules via an interface of the firmware sensor layer that abstracts the various sensors. In embodiments, the usage modules may be configured to act upon the sensor data in various ways, including, e.g., but not limited to, utilizing sensor data concerning environmental factors in deciding whether or not to terminate the boot process, utilizing the sensor data to seal data to the computing device, utilizing sensor data to verify the sensor or calibrate the sensor during the boot process.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
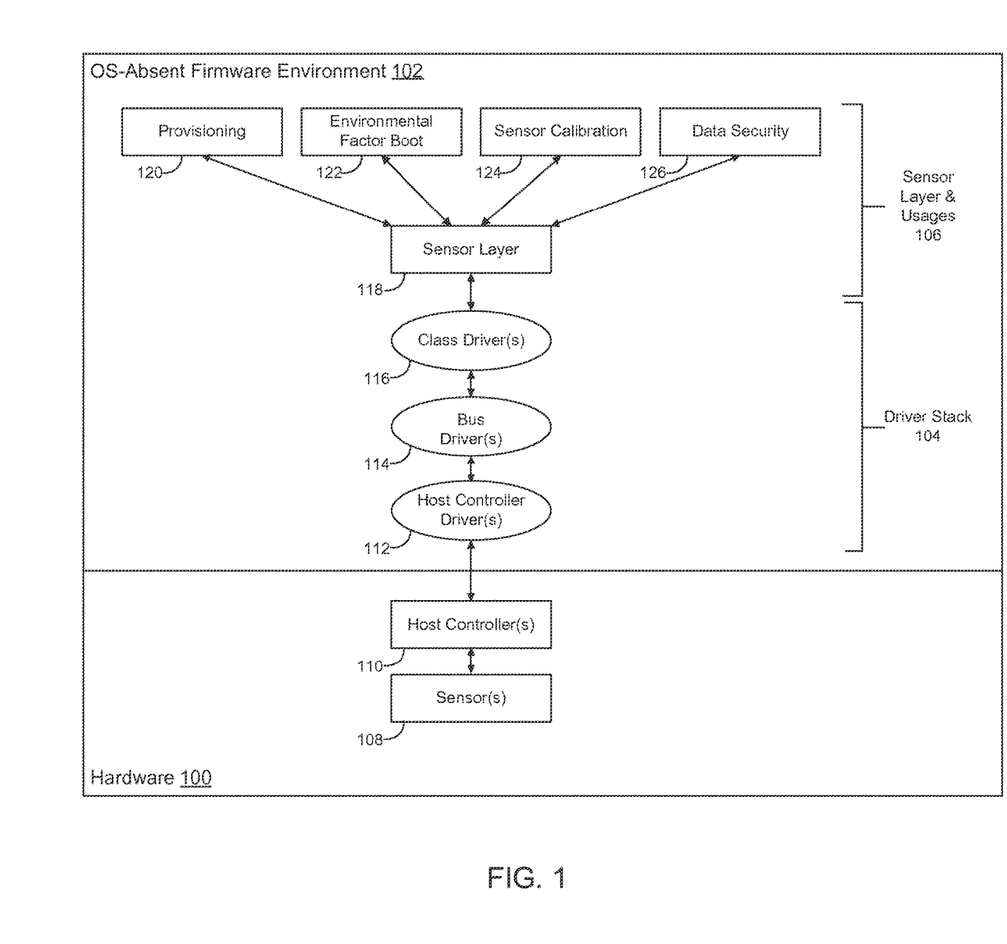
FIG. 1 depicts a schematic illustration of a computing environment having a firmware sensor layer, in accordance with various embodiments of the present disclosure.

FIG. 1 depicts a schematic illustration of a computing environment having a firmware sensor layer 118, in accordance with various embodiments of the present disclosure. In embodiments, the computing environment may include hardware 100 and an operating system-absent (OS-absent) firmware environment 102. OS-absent firmware environment 102 may, in some embodiments, be divided into two sections: a driver stack 104 and sensor layer and usages 106. Driver stack 104 may, in some embodiments, be configured to provide communication between firmware sensor layer (hereinafter, simply sensor layer) 118 and hardware 100.

Hardware 100 may include one or more sensors 108 coupled with host controller 110. Sensors 108 may include any number or type of sensor including, but not limited to, image sensor; audio sensor; touch sensors; global positioning system (GPS); accelerometer; gyroscope; altimeter; moisture sensors; humidity sensors; light sensors; pressure sensors; signal related sensors, such as infrared, Bluetooth, or Wi-Fi; or any combination thereof. Host controller 110 may be configured to control various low-level data transmissions, including transmission of data packets to and from sensors 108, for example.

In embodiments, driver stack 104 may include one or more host controller drivers 112, one or more bus drivers 114, and one or more class drivers 116, all of which are referred to singularly hereinafter. Host controller driver 112 may, in some embodiments, be communicatively coupled with host controller 110 and bus driver 114. Host controller driver 112 maybe configured to provide a generic interface between bus driver 114 and host controller 110. Host controller driver 112 may include any type of customary host controller driver such as, but not limited to, an enhanced host controller interface (EHCI) driver, an open host controller interface (OHCI) driver, a universal host controller interface (UNCI), driver, or any combination thereof.

Bus driver 114 may be communicatively coupled with host controller driver 112 and class driver 116 and may be configured to interface between class driver 116 and host controller driver 112. Bus driver 114 may be configured to provide an array of services, such as, for example, handling connection of one or more pieces of hardware (e.g., sensor(s) 108) to the computing device as well as disconnection therefrom. Bus driver 114 may also provide basic initialization of the one or more pieces of hardware, driver selection for the one or more pieces of hardware, and/or higher-level management of communication channels with the one or more pieces of hardware. Communication bus driver 114 may be, for example, a universal serial bus (USB) driver, a Bluetooth driver, or any other suitable bus or communication driver.

Class driver 116 may be communicatively coupled with bus driver 114 and sensor layer 118 and may be configured to interface between sensor layer 118 and communication bus driver 114. Class driver 116 may be configured to implement an array of functionality utilizing a set of standardized protocols common to a class of hardware devices. Class driver 116 may, in some embodiments, provide sufficient functionality for the operation of hardware devices that fall within the class. In other embodiments, a separate driver that corresponds with a given hardware device may be utilized in place of, or in addition to, class driver 116. Class driver 116 may be any type of customary class driver, such as, for example, any of the USB class drivers, including, but not limited to, a human interface device (HID) class driver, physical interface device (PID) class driver, content security class driver, personal healthcare class driver, diagnostic device class driver, wireless controller class driver, etc.

Sensor layer 118 may be communicatively coupled with class driver 116 and one or more firmware usage modules (e.g., usage modules 120-126) and may be configured to interface between class driver 116 and the one or more firmware usage modules. In embodiments, sensor layer 118 may be configured to receive and aggregate sensor data produced by any number of sensors (e.g., sensor(s) 108) coupled with the computing device and may be configured to provide the data to the firmware usage modules via an interface that abstracts the sensors to the one or more firmware usage modules. This abstraction may obfuscate sensor-specific information, allowing the firmware usage modules access to data produced by individual sensors without needing to be aware of the specifics of the sensor hardware. In some embodiments, while obfuscating sensor-specific information, sensor layer 118 may also be configured to provide sensor-specific information upon request, such as that discussed in reference to the example process flows of FIGS. 4 and 5. As depicted, sensor layer 118 may be configured to operate in an OS-absent firmware environment, such as, for example, during a boot process of the computing device, during recovery of the computing device, or in an OS-absent operational mode (e.g., during a unified extensible firmware interface (UEFI) shell runtime, such as that discussed below and depicted in FIG. 2 or 3). As a result, sensor layer 118 may operate independent of an OS on the computing device and may provide sensor support to the computing device during the boot process of the computing device, or in other OS-absent contexts, such as when the computing device is in a low power state (e.g., when the computing device is in a sleep mode) or when the computing device is operating in an OS-absent operational mode. In some embodiments, sensor layer 118 may be composed of multiple sensor sub-layers, wherein each sensor sub-layer may communicate with a different class driver, bus driver, etc. For example, one sensor sub-layer may communicate with a sensor via USB, while another sensor sub-layer may communicate with sensors via Bluetooth.

As discussed above, sensor layer 118 may be configured to provide sensor data to one or more usage modules, such as provisioning module 120, environmental factor boot module 122, sensor calibration module 124, and data security module 126. Usage modules 120-126 are merely meant to be illustrative and should not be viewed as limiting of this disclosure. In embodiments, usage modules 120-126 may be implemented as firmware to be executed in OS-absent contexts, such as during the boot process of the computing device or in an OS-absent operational mode, (e.g., the UEFI shell runtime discussed elsewhere herein), and may be configured to act upon sensor data collected and provided to the individual usage modules by sensor layer 118.

Provisioning module 120 may, in some embodiments, be configured to receive requests for sensor data from one or more requesters that may not have direct access to sensor layer 118, and provisioning module 120 may be configured to provide data from sensor layer 118 to these requesters. In some embodiments, provisioning module 120 may only provide the requested data if one or more predefined conditions are met by the requester and/or the sensor data. In other embodiments, provisioning module 120 may be configured to enable or disable one or more features of the computing device if one or more predefined conditions are met. These conditions may be defined within provisioning module 120 or may be defined by another firmware module that may be accessible to provisioning module 120. The conditions may include any condition based upon sensor data provided to provisioning module 120 by sensor layer 118. As an example, if provisioning module 120 detects from the sensor data that the computing device is booting in a low light environment, then provisioning module 120 may provision a backlight for a keyboard attached to the computing device.

Environmental factor boot module 122 may, in some embodiments, be configured to receive sensor data from sensor layer 118 and apply one or more policies based at least in part on the sensor data. These policies may be defined within environmental factor boot module 122 or may be defined by another firmware module that may be accessible to environmental factor boot module 122. In embodiments, the sensor data may be associated with environmental factors defined by the one or more policies. These environmental factors may include, but are not limited to, data concerning temperature, moisture, humidity, altitude, sound pressure level, audio frequency, vibration, velocity, acceleration, and/or lighting.

In some embodiments, the one or more policies may include termination of the boot process based upon one or more environmental factors. For instance, environmental factor boot module 122 may be configured to terminate the boot process, or cause the boot process to be terminated, if one or more of sensors 108 indicate that the computing device is booting in an inhospitable environment for the computing device. As an example, if the computing device is booting in an environment that is too hot for the computing device to function properly, environmental factor boot module 122 may be configured to terminate the boot process or cause the boot process to terminate.

In other embodiments, environmental factor boot module 122 may be configured to selectively instantiate, or cause to be instantiated, one or more drivers based at least in part on one or more environmental factors associated with the sensor data. For instance, and merely as an example, one driver, or set of drivers, may be selected for instantiation in low light conditions while another driver or set of drivers may be selected for instantiation in other higher light conditions. Such lighting conditions may be determined utilizing sensor data from a light sensor of the environment in which the computing device is operated.

Sensor calibration module 124 may be configured to receive sensor data from sensor layer 118 and validate or calibrate at least a portion of the sensor data. To validate the portion of the sensor data, the sensor calibration module 124 may utilize known reference data to compare with sensor data received from sensor layer 118 and may validate the sensor data received against the reference value. In some embodiments, the reference value may be previously stored sensor data. In other embodiments, the reference value may be sensor data provided by a reference sensor. In still other embodiments, the reference value may be a reference value provided by the sensor through sensor layer 118. In some embodiments, the sensor calibration module 124 may then verify the validation to an operating system, upon initiation of the operating system, to attest to the accuracy of the validated sensor data.

To calibrate the portion of the sensor data, the sensor calibration module 124 may seek to validate the received sensor data against a reference value, as discussed above, and may seek to calibrate the sensor data in the event the validation fails. In some embodiments, sensor calibration module 124 may interact with sensor layer 118 to adjust the sensor that produced the received sensor data to cause data produced by the sensor to match the reference value. In other embodiments, sensor calibration module 124 may directly manipulate the received data to cause the data to match the reference value. In such an embodiment, manipulated data may then be provided to a requester or a measure of the manipulation may be reported to a requester. For instance, sensor calibration module 124 may provide a measure of the manipulation to an application that may utilize the measure of the manipulation to calibrate data provided to the application by sensor layer 118 or directly from the respective sensor.

Data security module 126 may be configured to secure, or seal, data to the computing device. In embodiments, data security module 126 may be configured to seal data to the computing device by encrypting the data utilizing local sensor information, which may then prevent the data from being decrypted without the local sensor information. The process for this is described in greater detail in reference to FIGS. 5 and 6, below.

Figure 2:
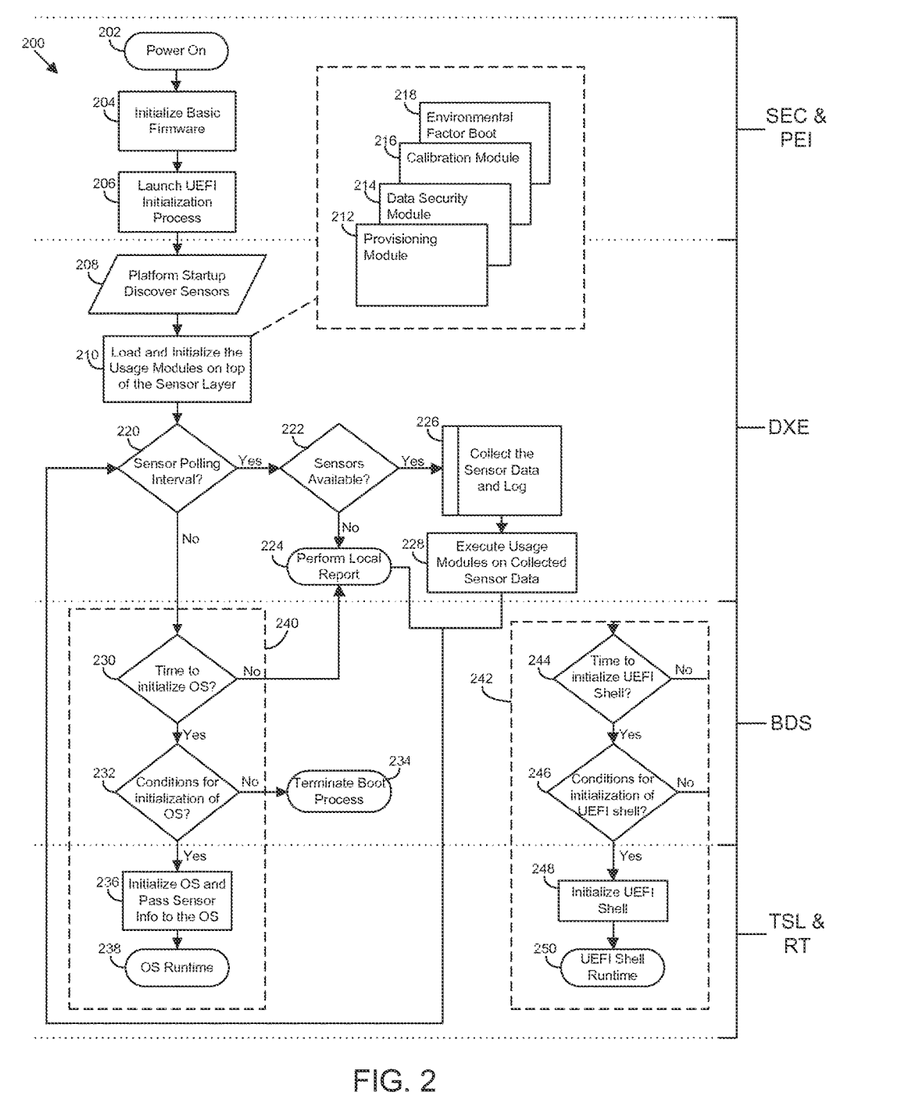
FIG. 2 depicts an illustrative boot flow of a computing device, in accordance with various embodiments of the present disclosure.

FIG. 2 depicts an illustrative boot flow 200 of a computing device, in accordance with various embodiments of the present disclosure. The stages of the boot flow are depicted along the right-hand side of FIG. 2. The SEC & PEI stage of the boot flow correspond with a Security phase and a Pre-Extensible Firmware Environment (PEI) phase of the boot flow, respectively. The DXE phase corresponds with the driver execution environment phase of the boot flow. The BDS phase corresponds with the Boot Device Selector phase of the boot flow. Finally, the TSL phase and the RT phase correspond with the transient system load phase and the runtime phase, respectively. Each of these phases is discussed in further detail in reference to FIG. 3, below. It will be appreciated that boot flow 200 represents a selected group of processes that may occur within an example boot flow; additional processes that are not applicable to this disclosure are not presented or discussed, as they will be readily understood in the art. In addition, it will be appreciated that the different processes of the boot flow, while delineated as occurring within specific phases of the boot flow, may actually span into an adjacent boot flow phase as necessary. Boot flow 200 may begin at block 202 where the computing device may be powered on or reset. After the computing device has powered on or reset, the process may enter an SEC and PEI phase, and proceed to block 204 where basic firmware may be initialized. This basic firmware may include firmware configured to initialize a motherboard, a chipset, a central processing unit (CPU), system memory, etc.

After initialization of the basic firmware, the process may proceed to block 206 where a UEFI phase may be initiated. The UEFI phase may initiate a driver execution environment (DXE) in which various processes may be performed, including the discovery of sensors at block 208. The sensors may be, for example, any type of sensor discussed herein. Once the sensors have been discovered, any usage modules may be loaded at block 210. These usage modules may include, for example, provisioning module 212, data security module 214, calibration module 216, and environmental factor boot module 218. Each of these usage modules may be configured to perform the functionality described elsewhere herein. The usage modules may be loaded by loading a set of instructions for implementing the individual usage modules into a memory of the computing device for execution thereof by a processor coupled with the memory.

The usage modules may also be initialized at block 210. This may include resetting any values associated with the individual usage modules that may not be persisted. For example, if a previous boot had triggered termination of the boot process by, or at the request of, environmental factor boot module 218, this may be carried out by a boot termination value, stored within environmental factor boot module 218 or within a memory accessible by environmental factor boot module 218, being set to a termination value, such as "1" to indicate that the termination value is true. In such a scenario, this termination value may be reset to a default value, such as "0" to indicate that the termination value is false.

After the usage modules have been loaded and initialized, the process may proceed to block 220 where it may be determined whether the computing device is within a sensor polling interval. If the computing device is within the sensor polling interval, the process may proceed to block 222 where a determination may be made as to whether any sensors are available. If there are no sensors available, the process may proceed to block 224 where a local report is generated and the process may loop back to block 220. If there are sensors available, the process may proceed to block 226 where the sensor data is collected and logged by a sensor layer, such as that described elsewhere herein. From block 226, the process may proceed to block 228 where the usage modules, e.g., usage modules 212-218 may be executed to perform any of the processes or functionalities described herein. Block 228 may be, for example, where the termination value, discussed above, is changed from false to true by environmental factor boot module 218 to cause the termination of the boot process based on one or more environmental factors. After block 228 is complete, the process may loop back to block 220 where this process may repeat.

If, at block 220, the computing device is not in a sensor polling interval, then the process may enter the BDS phase and proceed to block 230 where a determination may be made as to whether or not it is time to load and start the operating system (OS). If it is not time to initialize the OS, the process may proceed to block 224 where a local report is generated and the process may then loop back to block 220. If it is time to initialize the OS at block 230, then the process may proceed to block 232 where a determination is made as to whether the conditions for initialization are satisfied. Block 232 is where a variable such as the termination value may be evaluated to determine whether the boot process should proceed or be terminated. If block 232 is resolved in the negative, then the process may proceed to block 234 where the boot process may be terminated. As an example, if the termination value discussed above is true, then the result of block 232 may be negative and the boot process may be terminated at block 234. If block 232 is resolved in the affirmative, then the process may proceed to block 236 where the sensor information may be passed to the OS. In embodiments, where calibration module 216 verifies the results of one or more sensors or calibrates the one or more sensors, this verification or the calibration information may be passed to the OS at block 236 as well. At block 238, the computing device may enter the OS runtime environment and the process may end.

In an alternate embodiment, such as, for example, where the computing device may be an internet of things (IOT) edge device, a full operating system may not be necessary for the proper functioning of the computing device and the computing device may operate in an OS-absent operational mode. In another embodiment OS-absent mode may include when the main OS is suspended, such as via the invocation of a system management interrupt (SMI) leading to passing control of the main CPU's into system management mode (SMM). In such embodiments, the functionality depicted within block 240 may be replaced with the functionality depicted in block 242. In such an embodiment, if the sensor polling interval is finished, then the process may proceed to block 244 where a determination may be made as to whether or not it is time to initialize the unified extensible firmware interface (UEFI) operating environment (e.g., a UEFI Shell runtime). If it is not time to initialize the UEFI shell operating environment, the process may proceed to block 224 where a local report is generated and the process may then loop back to block 220. If it is time to initialize the UEFI shell operating environment at block 244, then the process may proceed to block 246 where a determination is made as to whether the conditions for initialization of the UEFI shell operating environment are satisfied. Block 246 is where a variable such as the termination value may be evaluated to determine whether the boot process should proceed or be terminated. If block 246 is resolved in the negative, then the process may proceed to block 234, discussed above, where the boot process may be terminated. As an example, if the termination value discussed above is true, then the result of block 246 may be negative and the boot process may be terminated at block 234. If block 246 is resolved in the affirmative, then the process may proceed to block 248 where the UEFI shell operating environment may be initialized. In embodiments, where calibration module 216 verifies the results of one or more sensors or calibrates the one or more sensors, this verification or the calibration information may be passed to the UEFI shell operating environment at block 248 as well. At block 250, the computing device may enter the UEFI shell runtime and the process may end.

Figure 3:
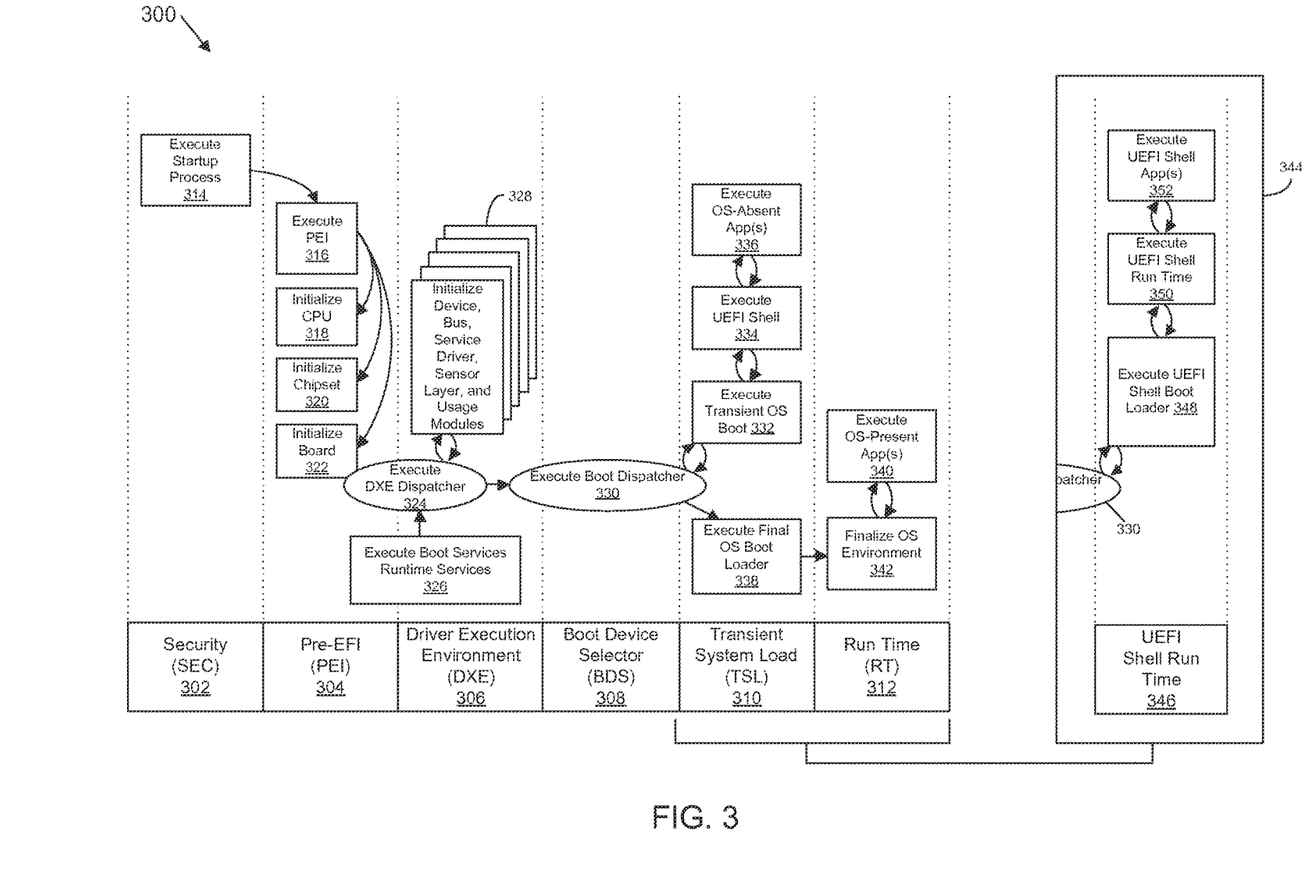
FIG. 3 depicts an alternative view of the boot flow of FIG. 2, in accordance with various embodiments of the present disclosure.

FIG. 3 depicts an alternative view of the boot flow of FIG. 2, in accordance with various embodiments of the present disclosure. Bootflow 300 may begin in a security (SEC) phase 302 where a startup process may execute at 314. The startup process may perform a number of preliminary actions such as, for example, flushing a central processing unit (CPU) cache of the computing device, executing a basic input/output system (BIOS) reset vector of the computing device to initiate a BIOS of the computing device, and establishing a data area in the CPU cache to enable a stack based programming language to be used prior to initialization of system memory.

The SEC phase 302 may hand off to a pre-extensible firmware interface (PEI) phase 304. In the PEI phase 304, a PEI module may be executed, or caused to be executed, at 316 by the BIOS. The PEI module may initialize, or cause the initialization of, the CPU of the computing device at 318, a chipset of the computing device at 320, and a motherboard of the computing device at 322. The PEI phase 304 may prepare the computing device for the driver execution environment (DXE) phase 306. Boot services and runtime services along with driver execution environment (DXE) dispatcher may be executed, or caused to executed, by the BIOS at 326 and 324, respectively. PEI phase 304 may hand off to DXE phase 306.

During DXE phase 306, firmware may be executed, such as DXE dispatcher at 324, which may be responsible for searching for and initializing drivers that provide device support during the boot process. As such, the DXE dispatcher may initialize a series of device, bus, and service drivers in blocks 328, such as drivers 112-116 of FIG. 1. Blocks 328 are where the sensor layer and any usage modules may also be loaded and initialized, such as firmware sensor layer 118 and firmware usage modules 120-126 of FIG. 1. The DXE dispatcher may execute, or cause initiation of execution of, boot dispatcher at 330, and then DXE phase 306 may hand off to the boot device selector (BDS) phase 308.

The boot dispatcher may implement a platform boot policy and may execute, or cause the execution of, transient OS boot loader at 332 and/or may execute, or cause the execution of, final OS boot loader at 338 during transient system toad (TSL) phase 310. In one embodiment, during TSL phase 310, transient OS boot loader at 332 may initiate execution of the UEFI shell at 334, which in turn may initiate execution of OS-absent application(s) at 336. The final OS boot loader may finalize the OS environment at 342, at which point the BIOS may hand over control of the computing device to the OS of the computing device. During the runtime phase the finalized OS environment may execute OS-present application(s) at 340.

In other embodiments, process 300 may be carried out independent of an OS in an OS-absent environment. An OS-absent environment may be implemented, for example, on an internet of things (IOT) edge device or any other computing device that does not require the full functionality provided by an OS. In such an environment, TSL phase 310 and RT phase 312 may be omitted and replaced with UEFI shell runtime phase 346 depicted in block 344 which may cause the computing device to achieve a UEFI operational state. In such an embodiment, boot dispatcher 330 may implement a platform boot policy and may execute, or cause the execution of, UEFI shell boot loader 346. UEFI shell boot loader 346 may initiate execution of the UEFI Shell runtime at 350 which may in turn initiate execution of one or more UEFI shell applications at 352. As such, the UEFI shell may maintain control of the computing device. The above mentioned UEFI shell applications may include, for example, the firmware sensor layer and/or sensor usages discussed above. As an example, firmware, such as provisioning module 120 of FIG. 1 may execute at 352 and may be configured to report sensor data provided by the firmware sensor layer to a remote server for aggregation of the sensor data with sensor data from other computing devices that may be similarly configured.

Figure 4:
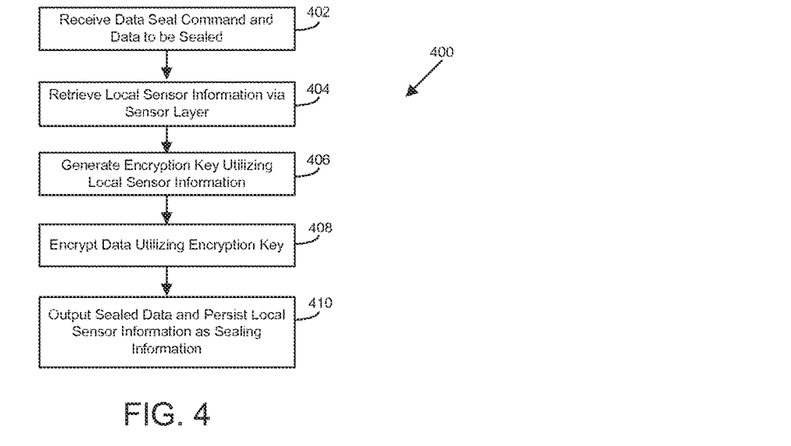
FIG. 4 depicts an example usage process flow for sealing data, during the boot process, by a data security module, in accordance with various embodiments of the present disclosure.

FIG. 4 depicts example sensor data usage process flow 400 for sealing data, in an OS-absent environment (e.g., during the boot process of a computing device or in an OS-absent operational state) by a data security module, such as data security module 126 of FIG. 1 or data security module 214 of FIG. 2, in accordance with various embodiments of the present disclosure. The process may begin at block 402 where a data seal command may be received during the boot process by the data security module along with data to be sealed from a requester. In some embodiments, the request may have been made by or initiated by a basic input/output system (BIOS) of a computing device. At block 404 the data security module may retrieve local sensor information via a firmware sensor layer (e.g., firmware sensor layer 118 of FIG. 1). The local sensor information may include sensor readings, sensor state information, and/or sensor calibration information. At block 406 an encryption key may be generated by the data security module utilizing the local sensor information received from the firmware sensor layer and, at block 408, the data may be encrypted by the data security module utilizing the encryption key, such that the data may be sealed to the computing device via the local sensor information even during the boot process. At block 410, the sealed data may be output by the data security module to the requester and the local sensor information may be persisted as sealing, or encryption, information.

Figure 5:
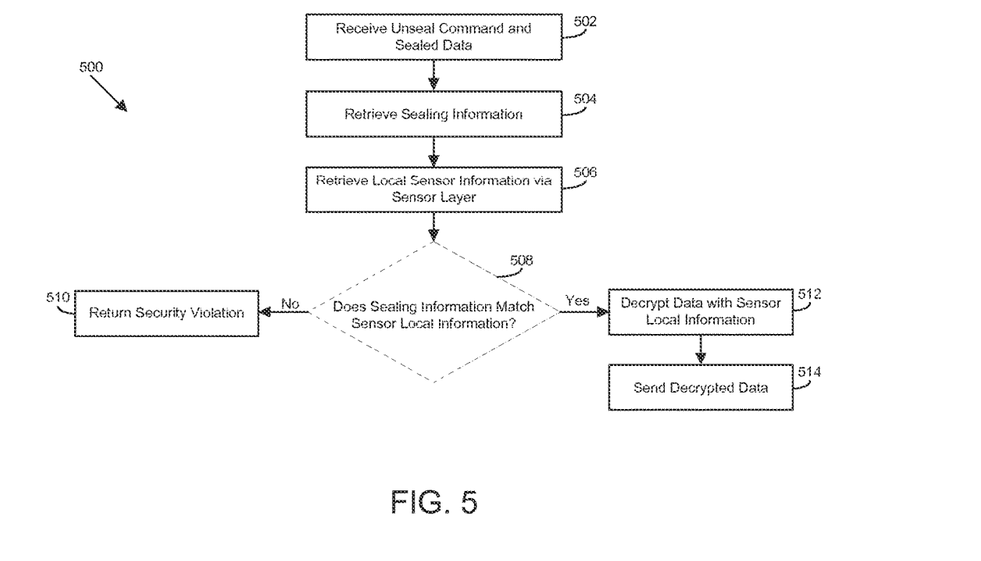
FIG. 5 depicts an example usage process flow for unsealing data during the boot process, in accordance with various embodiments of the present disclosure.

FIG. 5 depicts an illustrative example usage process flow 500 for unsealing data in an OS-absent environment (e.g., during the boot process of a computing device or in an OS-absent operational state), in accordance with various embodiments of the present disclosure. The process may begin at block 502 where an unseal command and sealed data may be received by the data security module from a requester, such as a BIOS of the computing device, during a boot process of a computing device. At block 504, in some embodiments, sealing information associated with the sealed data may be retrieved by the data security module. The sealing information may be retrieved from a repository where the sealing information was persisted or may be retrieved from the request received at block 502. At block 506 local sensor information corresponding with the sealing information may be retrieved by the data security module via a firmware sensor layer (e.g., firmware sensor layer 118 of FIG. 1). At block 508, the data security module may make a determination as to whether the sealing information matches the local sensor information. If the sealing information does not match the local sensor information, then the process may proceed to block 510 where the data security module may return a security violation. If the sealing information does match the local sensor information, then the process may proceed to block 512 where the data security module may decrypt the sealed data utilizing the local sensor information, such that sealed data of the computing device may be unsealed via the local sensor information even during the boot process. At block 514 the data security module may send the decrypted data to the requester.

Figure 6:
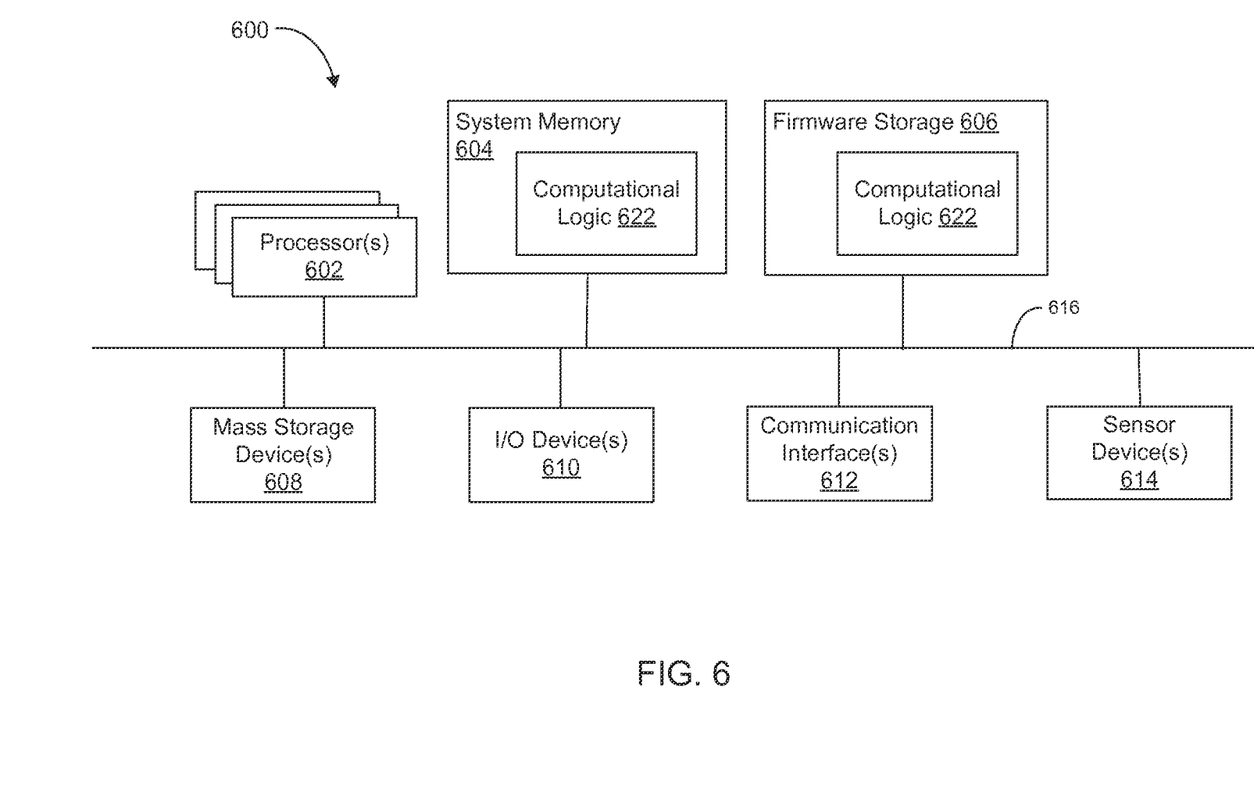
FIG. 6 depicts an example computing device suitable to implement a firmware sensor layer or any of the sensor usage modules, in accordance with various embodiments of the present disclosure.

FIG. 6 depicts an example computing device suitable for having a firmware sensor layer, such as firmware sensor layer 118 of FIG. 1, or any of the sensor usage modules, such as those described previously herein, in accordance with various embodiments of the present disclosure. As shown, computing device 600 may include one or more processors or processor cores 602, and system memory 604. In embodiments, multiple processor cores 602 may be disposed on one die. For the purpose of this application, including the claims, the terms "processor" and "processor cores" may be considered synonymous, unless the context clearly requires otherwise. Computing device 600 may include firmware storage 606. Firmware storage 606 may take the form of non-volatile memory, including, but not limited to, read-only memory (ROM), erasable programmable read only memory (EPROM), and/or flash memory. Additionally, computing device 600 may include mass storage device(s) 608 (such as diskette, hard drive, compact disc read-only memory (CD-ROM), and so forth), input/output (I/O) device(s) 610 (such as display, keyboard, cursor control, and so forth), communication interfaces 612 (such as network interface cards, modems, and so forth), and sensor device(s) 614, which may include, but are not limited to, any of the sensors discussed herein. The elements may be coupled to each other via system bus 616, which may represent one or more buses. In the case of multiple buses, they may be bridged by one or more bus bridges (not shown).

Each of these elements may perform its conventional functions known in the art. In particular, system memory 604 and firmware storage 606 may be employed to store a working copy and a permanent copy of programming instructions implementing the operations described earlier, e.g., but not limited to, operations associated with a firmware sensor layer and/or sensor usage modules, generally referred to as computational logic 622. The various operations may be implemented by assembler instructions supported by processor(s) 602 or high-level languages, such as, for example, C, that may be compiled into such instructions.

The permanent copy of the programming instructions may be placed into firmware storage 606 in the factory, or in the field, through, for example, a distribution medium (not shown), such as a compact disc (CD), or through communication interface 612 (from a distribution server (not shown)). That is, one or more distribution media having an implementation of a firmware sensor layer and/or one or more sensor usage modules may be employed to distribute the sensor layer and/or one or more sensor usage modules to various computing devices.

The number, capability, and/or capacity of these elements 610-614 may vary, depending on the intended use of example computing device 600, e.g., whether example computing device 600 is a laptop, a netbook, a notebook, an ultrabook, a smartphone, a tablet, a personal digital assistant, an ultra-mobile personal computer, a mobile phone, a desktop computer, a server, an internet of things device, or a set-top box. The constitutions of these elements 610-614 are otherwise known, and accordingly will not be further described.

Figure 7:
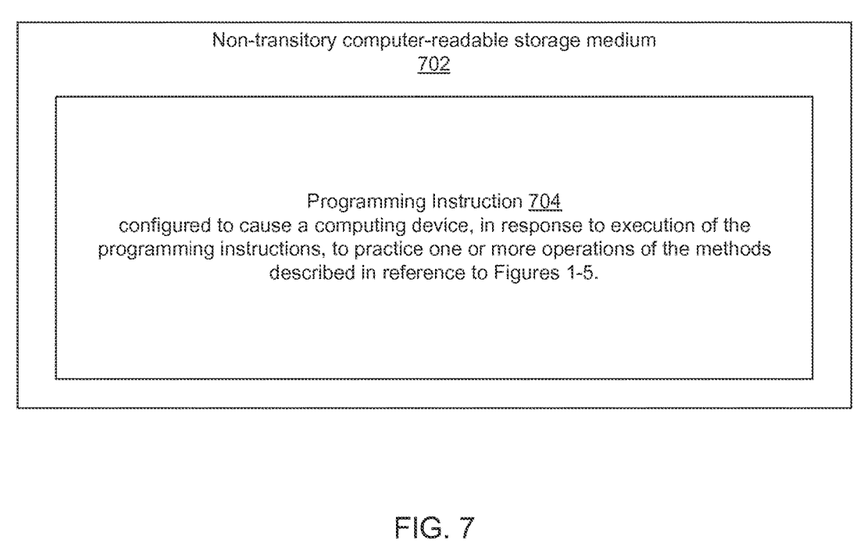
FIG. 7 illustrates an example storage medium with instructions configured to enable a computing device to practice the present disclosure, in accordance with various embodiments.

FIG. 7 depicts an illustrative non-transitory computer-readable storage medium having instructions configured to practice all or selected ones of the operations associated with the sensor layer and/or one or more sensor usage modules, earlier described, in accordance with various embodiments. As illustrated, non-transitory computer-readable storage medium 702 may include a number of programming instructions 704. Programming instructions 704 may be configured to enable a device, e.g., computing device 600, in response to execution of the programming instructions, to perform one or more operations of the processes described in reference to FIGS. 1-5. In alternate embodiments, programming instructions 704 may be disposed on multiple non-transitory computer-readable storage media 702 instead. In still other embodiments, programming instructions 704 may be encoded in transitory computer-readable signals.

Referring back to FIG. 6, for one embodiment, at least one of processors 602 may be packaged together with computational logic 622 (in lieu of storing in memory 604 and/or firmware storage 606) configured to perform one or more operations of the processes described with reference to FIGS. 1-5. For one embodiment, at least one of processors 602 may be packaged together with computational logic 622 configured to practice aspects of the methods described in reference to FIGS. 1-5 to form a System in Package (SiP). For one embodiment, at least one of processors 602 may be integrated on the same die with computational logic 622 configured to perform one or more operations of the processes described in reference to FIGS. 1-5. For one embodiment, at least one of processors 602 may be packaged together with computational logic 622 configured to perform one or more operations of the processes described in reference to FIGS. 1-5 to form a System on Chip (SoC). Such a SoC may be utilized in any suitable computing device.

For the purposes of this description, a computer-usable or computer-readable medium can be any medium that can contain, store, communicate, propagate, or transport the program for use by or in connection with the instruction execution system, apparatus, or device. The medium can be volatile or non-volatile memory. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Embodiments of the disclosure can take the form of an entirely hardware embodiment, an entirely software embodiment, or an embodiment containing both hardware and software elements. In various embodiments, software may include, but is not limited to, firmware, resident software, microcode, and the like. Furthermore, the disclosure can take the form of a computer program product accessible from a computer-usable or computer-readable medium providing program code for use by or in connection with a computer or any instruction execution system.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the disclosure. This application is intended to cover any adaptations or variations of the embodiments discussed herein. Therefore, it is manifestly intended that the embodiments of the disclosure be limited only by the claims and the equivalents thereof.

EXAMPLES

According to various embodiments, the present disclosure describes a number of examples. Example 1 is a computing device for computing, comprising: a processor; and firmware to be operated by the processor that includes one or more modules and a sensor layer to: receive, in an operating system (OS)-absent firmware environment, sensor data produced by a plurality of sensors, wherein the plurality of sensors are of the computing device or operatively coupled with the computing device; and selectively provide the sensor data to the one or more modules via an interface of the sensor layer that abstracts the plurality of sensors.

Example 2 may include the subject matter of Example 1, further comprising an operating system to be instantiated on the computing device, wherein the firmware is independent of the operating system.

Example 3 may include the subject matter of Example 1, wherein the one or more modules includes an environmental factor boot module to: receive a portion of sensor data from the sensor layer through the interface of the sensor layer; and apply one or more policies based at least in part on the portion of sensor data, wherein the portion of sensor data is associated with one or more environmental factors defined by the one or more policies Example 4 may include the subject matter of Example 3, wherein to apply one or more policies is to terminate a boot process, of the computing device, when a determination is made that the one or more policies are violated, based at least in part on the portion of sensor data associated with the one or more environmental factors.

Example 5 may include the subject matter of Example 3, wherein to apply one or more policies is to selectively instantiate one or more drivers based at least in part on the portion of sensor data associated with the environmental factors.

Example 6 may include the subject matter of any one of Examples 3-5, wherein the environmental factors include one or more of temperature, moisture, humidity, altitude, sound pressure level, audio frequency, vibration, velocity, acceleration, or lighting.

Example 7 may include the subject matter of Example 1, wherein the one or more firmware modules includes a sensor calibration module to: validate a sensor of the plurality of sensors based at least in part on the portion of sensor data produced by the sensor; or calibrate a sensor of the plurality of sensors based at least in part on the portion of sensor data produced by the sensor.

Example 8 may include the subject matter of Example 7, wherein the sensor calibration module is to validate a sensor of the plurality of sensors and is further to verify to an operating system of the computing device the validity of the sensor data produced by the sensor.

Example 9 may include the subject matter of Example 7, wherein the sensor calibration module is to calibrate the sensor of the plurality of sensors through: interaction with the sensor layer to cause the sensor data produced by the sensor to match a reference value; or manipulation of the sensor data to cause the sensor data to match the reference value.

Example 10 may include the subject matter of Example 1, wherein the one or more firmware modules includes a data security module to: receive data to be encrypted; generate an encryption key based at least in part on local sensor information received from the sensor layer; encrypt the data utilizing the encryption key; and persist the local sensor information in a memory of the computing device as encryption information.

Example 11 may include the subject matter of Example 10, wherein the data security module is to further: receive a request to decrypt the data; receive additional local sensor information from the sensor layer; retrieve the encryption information; generate a decryption key based at least in part on the additional local sensor information when the additional local sensor information matches the encryption information; and decrypt the information utilizing the decryption key.

Example 12 may include the subject matter of either of Examples 10 or 11, wherein the local sensor information includes one or more of sensor readings, sensor state, or sensor calibration.

Example 13 may include the subject matter of Example 1, wherein the OS-absent firmware environment is a unified extensible firmware interface (UEFI) environment of a boot process.

Example 14 may include the subject matter of Example 13, wherein the OS-absent firmware environment is a driver execution environment (DXE) of the UEFI environment.

Example 15 may include the subject matter of Example 13, wherein the computing device is independent of an operating system and the boot process is to instantiate an extensible firmware interface operating environment to result in the computing device achieving an OS-absent operational state.

Example 16 may include the subject matter of any one of Examples 1-15, wherein one or more sensors of the plurality of sensors are disposed on the computing device, and operatively coupled with the processor via a bus interface.

Example 17 may include the subject matter of any one of Examples 1-15, wherein one or more sensors of the plurality of sensors are communicatively coupled with the computing device via a human interface device, HID, driver.

Example 18 may include the subject matter of any one of Example 1 or 3-15, wherein the computing device is an internet of things edge device comprising the plurality of sensors.

Example 19 may include the subject matter of any one of Examples 1-15, wherein the computing device is selected from a group consisting of a laptop, a netbook, a notebook, an ultrabook, a smartphone, a tablet, a personal digital assistant, an ultra-mobile personal computer, a mobile phone, a desktop computer, a server, an internet of things device, or a set-top box.

Example 20 is a method for computing, comprising: instantiating, by an operating system (OS)-absent firmware environment of a computing device, a sensor layer having an interface that provides an abstraction of a plurality of sensors; receiving, by the sensor layer in the OS-absent firmware environment, sensor data produced by a plurality of sensors; and selectively providing, by the sensor layer, the sensor data to one or more firmware modules via the interface of the sensor layer.

Example 21 may include the subject matter of Example 20, wherein the operating system (OS)-absent firmware environment is part of a boot process to result in the instantiation of an operating system on the computing device, and wherein the firmware environment is independent of the operating system.

Example 22 may include the subject matter of Example 20, wherein the one or more firmware modules include an environmental factor boot module and further comprising: receiving, by the environmental factor boot module, a portion of sensor data from the sensor layer through the interface of the sensor layer; and applying, by the environmental factor boot module, one or more policies based at least in part on the portion of sensor data, wherein the portion of sensor data is associated with one or more environmental factors defined by the one or more policies Example 23 may include the subject matter of Example 22, wherein applying the one or more policies further comprises: determining whether the one or more policies are violated based at least in part on the portion of sensor data associated with the one or more environmental factors; and terminating a boot process, of the computing device, based at least in part on a result of the determining.

Example 24 may include the subject matter of Example 22, wherein applying one or more policies further comprises selectively instantiating one or more drivers based at least in part on the portion of sensor data associated with the environmental factors.

Example 25 may include the subject matter of any one of Examples 22-24, wherein the environmental factors include one or more of temperature, moisture, humidity, altitude, sound pressure level, audio frequency, vibration, velocity, acceleration, or lighting.

Example 26 may include the subject matter of Example 20, wherein the one or more firmware modules include a sensor calibration module and further comprising: validating, by the sensor calibration module, a sensor of the plurality of sensors based at least in part on the portion of sensor data produced by the sensor; or calibrating, by the sensor calibration module, a sensor of the plurality of sensors based at least in part on the portion of sensor data produced by the sensor.

Example 27 may include the subject matter of Example 26, wherein validating a sensor of the plurality of sensors further comprises verifying to an operating system of the computing device the validity of the sensor data produced by the sensor.

Example 28 may include the subject matter of Example 26, wherein calibrating the sensor of the plurality of sensors further comprises: interacting with the sensor layer to cause the sensor data produced by the sensor to match a reference value; or manipulating the sensor data to cause the sensor data to match the reference value.

Example 29 may include the subject matter of Example 20, wherein the one or more firmware modules include a data security module and further comprising: receiving, by the data security module, data to be encrypted; generating, by the data security module, an encryption key based at least in part on local sensor information received from the sensor layer; encrypting, by the data security module, the data utilizing the encryption key; and persisting, by the data security module, the local sensor information in a memory of the computing device as encryption information.

Example 30 may include the subject matter of Example 29, further comprising: receiving, by the data security module, a request to decrypt the data; receiving, by the data security module, additional local sensor information from the sensor layer; retrieving, by the data security module, the encryption information; generating, by the data security module, a decryption key based at least in part on the additional local sensor information when the additional local sensor information matches the encryption information; and decrypting, by the data security module, the data utilizing the decryption key.

Example 31 may include the subject matter of either of Examples 29 or 30, wherein the local sensor information includes one or more of sensor readings, sensor state, or sensor calibration.

Example 32 may include the subject matter of Example 20, wherein the OS-absent firmware environment is a unified extensible firmware interface (UEFI) environment of a boot process of the computing device.

Example 33 may include the subject matter of Example 32, wherein the OS-absent firmware environment is a driver execution environment (DXE) of the UEFI environment.

Example 34 may include the subject matter of Example 32, wherein the computing device is independent of an operating system and further comprising instantiating, by the firmware environment, an extensible firmware interface operating environment resulting in the computing device achieving an OS-absent operational state.

Example 35 may include the subject matter of Example 20, wherein one or more sensors of the plurality of sensors are disposed on the computing device, and operatively coupled with the processor via a bus interface.

Example 36 may include the subject matter of Example 20, wherein one or more sensors of the plurality of sensors are communicatively coupled with the computing device via a human interface device, HID, driver.

Example 37 may include the subject matter of Example 20, wherein the computing device is an internet of things edge device comprising the plurality of sensors.

Example 38 may include the subject matter of Example 20, wherein the computing device is selected from a group consisting of a laptop, a netbook, a notebook, an ultrabook, a smartphone, a tablet, a personal digital assistant, an ultra-mobile personal computer, a mobile phone, a desktop computer, a server, or a set-top box.

Example 39 is one or more computer-readable media having a plurality of instructions stored thereon, the plurality of instructions, when executed by a processor of a computing device, cause the computing device to carry out the method of any one of Examples 20-38.

Example 40 is one or more computer-readable media having a plurality of instructions stored thereon, the plurality of instructions, when executed by a processor of a computing device, provide the computing device with a firmware environment that includes one or more modules and a sensor layer to, the sensor layer to: receive, in an operating system (OS)-absent environment, sensor data produced by a plurality of sensors, wherein the plurality of sensors are of the computing device or operatively coupled with the computing device; and selectively provide the sensor data to the one or more modules via an interface of the sensor layer that abstracts the plurality of sensors.

Example 41 may include the subject matter of Example 40, wherein the firmware is independent of an operating system of the computing device.

Example 42 may include the subject matter of Example 40, wherein the one or more modules includes an environmental factor boot module to: receive a portion of sensor data from the sensor layer through the interface of the sensor layer; and apply one or more policies based at least in part on the portion of sensor data, wherein the portion of sensor data is associated with one or more environmental factors defined by the one or more policies Example 43 may include the subject matter of Example 42, wherein to apply one or more policies is to terminate a boot process, of the computing device, when a determination is made that the one or more policies are violated, based at least in part on the portion of sensor data associated with the one or more environmental factors.

Example 44 may include the subject matter of Example 42, wherein to apply one or more policies is to selectively instantiate one or more drivers based at least in part on the portion of sensor data associated with the environmental factors.

Example 45 may include the subject matter of any one of Examples 42-44, wherein the environmental factors include one or more of temperature, moisture, humidity, altitude, sound pressure level, audio frequency, vibration, velocity, acceleration, or lighting.

Example 46 may include the subject matter of Example 39, wherein the one or more firmware modules includes a sensor calibration module to: validate a sensor of the plurality of sensors based at least in part on the portion of sensor data produced by the sensor; or calibrate a sensor of the plurality of sensors based at least in part on the portion of sensor data produced by the sensor.

Example 47 may include the subject matter of Example 46, wherein the sensor calibration module is to validate a sensor of the plurality of sensors and is further to verify to an operating system of the computing device the validity of the sensor data produced by the sensor.

Example 48 may include the subject matter of Example 46, wherein the sensor calibration module is to calibrate the sensor of the plurality of sensors through: interaction with the sensor layer to cause the sensor data produced by the sensor to match a reference value; or manipulation of the sensor data to cause the sensor data to match the reference value.

Example 49 may include the subject matter of Example 40, wherein the one or more firmware modules includes a data security module to: receive data to be encrypted; generate an encryption key based at least in part on local sensor information received from the sensor layer; encrypt the data utilizing the encryption key; and persist the local sensor information in a memory of the computing device as encryption information.

Example 50 may include the subject matter of Example 49, wherein the data security module is to further: receive a request to decrypt the data; receive additional local sensor information from the sensor layer; retrieve the encryption information; generate a decryption key based at least in part on the additional local sensor information when the additional local sensor information matches the encryption information; and decrypt the data utilizing the decryption key.

Example 51 may include the subject matter of either of Examples 49 or 50, wherein the local sensor information includes one or more of sensor readings, sensor state, or sensor calibration.

Example 52 may include the subject matter of Example 40, wherein the OS-absent firmware environment is a unified extensible firmware interface (UEFI) environment of a boot process.

Example 53 may include the subject matter of Example 40, wherein the OS-absent firmware environment is a driver execution environment (DXE) of the UEFI environment.

Example 54 may include the subject matter of Example 52, wherein the boot process is to instantiate an extensible firmware interface operating environment that results in the computing device achieving an operational state.

Example 55 may include the subject matter of Example 40, wherein one or more sensors of the plurality of sensors are disposed on the computing device, and operatively coupled with the processor via a bus interface.

Example 56 may include the subject matter of Example 40, wherein one or more sensors of the plurality of sensors are communicatively coupled with the computing device via a human interface device, HID, driver, and wherein the sensor layer is further to utilize the HID device driver to communicate with the plurality of sensors.

Example 57 may include the subject matter of Example 40, wherein the computing device is an internet of things edge device comprising the plurality of sensors.

Example 58 may include the subject matter of Example 40, wherein the computing device is selected from a group consisting of a laptop, a netbook, a notebook, an ultrabook, a smartphone, a tablet, a personal digital assistant, an ultra-mobile personal computer, a mobile phone, a desktop computer, a server, or a set-top box.

Example 59 is a computing device for computing comprising: means for instantiating, in an operating system (OS)-absent firmware environment, a sensor layer having an interface that provides an abstraction of a plurality of sensors; means for receiving, in the OS-absent firmware environment, data produced by a plurality of sensors, wherein the plurality of sensors are of the computing device or operatively coupled with the computing device; and means for selectively providing the sensor data to one or more firmware modules via the interface of the sensor layer.

Example 60 may include the subject matter of Example 59, wherein the OS-absent firmware environment is part of a boot process to result in the instantiation of an operating system on the computing device.

Example 61 may include the subject matter of Example 59, wherein the one or more firmware modules include an environmental factor boot module, the environmental factor boot module comprising: means for receiving a portion of sensor data from the sensor layer through the interface of the sensor layer; and means for applying one or more policies based at least in part on the portion of sensor data, wherein the portion of sensor data is associated with one or more environmental factors defined by the one or more policies Example 62 may include the subject matter of Example 61, wherein means for applying the one or more policies further comprises: means for determining whether the one or more policies are violated based at least in part on the portion of sensor data associated with the one or more environmental factors; and means for terminating a boot process, of the computing device, based at least in part on a result of the determining.

Example 63 may include the subject matter of Example 61, wherein means for applying one or more policies further comprises means for selectively instantiating one or more drivers based at least in part on the portion of sensor data associated with the environmental factors.

Example 64 may include the subject matter of any one of Examples 61-63, wherein the environmental factors include one or more of temperature, moisture, humidity, altitude, sound pressure level, audio frequency, vibration, velocity, acceleration, or lighting.

Example 65 may include the subject matter of Example 59, wherein the one or more firmware modules include a sensor calibration module, the sensor calibration module comprising: means for validating a sensor of the plurality of sensors based at least in part on the portion of sensor data produced by the sensor; or means for calibrating a sensor of the plurality of sensors based at least in part on the portion of sensor data produced by the sensor.

Example 66 may include the subject matter of Example 65, wherein means for validating a sensor of the plurality of sensors further comprises means for verifying to an operating system of the computing device the validity of the sensor data produced by the sensor.

Example 67 may include the subject matter of Example 65, wherein means for calibrating the sensor of the plurality of sensors further comprises: means for interacting with the sensor layer to cause the sensor data produced by the sensor to match a reference value; or means for manipulating the sensor data to cause the sensor data to match the reference value.

Example 68 may include the subject matter of Example 59, wherein the one or more firmware modules include a data security module, the data security module comprising: means for receiving data to be encrypted; means for generating an encryption key based at least in part on local sensor information received from the sensor layer; means for encrypting the data utilizing the encryption key; and means for persisting the local sensor information in a memory of the computing device as encryption information.

Example 69 may include the subject matter of Example 68, wherein the data security module further comprises: means for receiving a request to decrypt the data; means for receiving additional local sensor information from the sensor layer; means for retrieving the encryption information; means for generating a decryption key based at least in part on the additional local sensor information when the additional local sensor information matches the encryption information; and means for decrypting the data utilizing the decryption key.

Example 70 may include the subject matter of either of Examples 68 or 69, wherein the local sensor information includes one or more of sensor readings, sensor state, or sensor calibration.

Example 71 may include the subject matter of Example 59, wherein the OS-absent firmware environment is a unified extensible firmware interface (UEFI) environment of a boot process.

Example 72 may include the subject matter of Example 71, wherein the OS-absent firmware environment is a driver execution environment (DXE) of the UEFI environment.

Example 73 may include the subject matter of Example 71, wherein the computing device is independent of an operating system and further comprising means for instantiating an extensible firmware interface operating environment resulting in the computing device achieving an operational state.

Example 74 may include the subject matter of Example 59, wherein one or more sensors of the plurality of sensors are disposed on the computing device.

Example 75 may include the subject matter of Example 59, wherein one or more sensors of the plurality of sensors are communicatively coupled with the computing device via a human interface device, HID, driver.

Example 76 may include the subject matter of Example 59, wherein the computing device is an internet of things edge device comprising the plurality of sensors.

Example 77 may include the subject matter of Example 59, wherein the computing device is selected from a group consisting of a laptop, a netbook, a notebook, an ultrabook, a smartphone, a tablet, a personal digital assistant, an ultra-mobile personal computer, a mobile phone, a desktop computer, a server, or a set-top box.

What is claimed is:

1. A computing device for computing, comprising:
a processor; and
firmware to be operated by the processor while the computing device is operating without an operating system (OS) that includes one or more modules, including an environmental factor boot module, and a sensor layer,
wherein the sensor layer is to:
receive sensor data produced by a plurality of sensors, wherein the plurality of sensors is of the computing device or operatively coupled with the computing device;
aggregate the sensor data from the plurality of sensors; and
selectively provide the sensor data or the aggregated sensor data to the one or more modules via an interface of the sensor layer that abstracts the plurality of sensors; and
wherein the environmental factor boot module is to selectively instantiate one or more drivers for one or more corresponding sensors of the plurality of sensors, based at least in part on a portion of sensor data or aggregated sensor data associated with one or more environmental factors.

2. The computing device of claim 1, further comprising an operating system to be instantiated on the computing device, wherein the firmware is independent of the operating system.

3. The computing device of claim 1, wherein the environmental factor boot module is to:
receive a portion of sensor data or aggregated sensor data from the sensor layer through the interface of the sensor layer; and
apply one or more policies based at least in part on the portion of sensor data or aggregated sensor data, wherein the portion of sensor data or aggregated sensor data is associated with the one or more environmental factors defined by the one or more policies.

4. The computing device of claim 3, wherein to apply one or more policies is to terminate a boot process, of the computing device, when a determination is made that the one or more policies are violated, based at least in part on the portion of sensor data or aggregated sensor data associated with the one or more environmental factors.

5. The computing device of claim 1, wherein the environmental factors include one or more of temperature, moisture, humidity, altitude, sound pressure level, audio frequency, vibration, velocity, acceleration, or lighting.

6. The computing device of claim 1, wherein the computing device is independent of an operating system and the OS-absent firmware environment is part of a boot process to result in the computing device achieving an OS-absent operational state.

7. The computing device of claim 1, wherein one or more sensors of the plurality of sensors are disposed on the computing device, and operatively coupled with the processor via a bus interface.

8. The computing device of claim 1, wherein one or more sensors of the plurality of sensors are communicatively coupled with the computing device via a human interface device, HID, driver.

9. The computing device of claim 1, wherein the computing device is an internet of things edge device comprising the plurality of sensors.

10. The computing device of claim 1, wherein the computing device is selected from a group consisting of a laptop, a netbook, a notebook, an ultrabook, a smartphone, a tablet, a personal digital assistant, an ultra-mobile personal computer, a mobile phone, a desktop computer, a server, or a set-top box.

11. A method for computing, comprising:
instantiating, by an operating system (OS)-absent firmware environment of a computing device, a sensor layer having an interface that provides an abstraction of a plurality of sensors;
receiving, by the sensor layer in the OS-absent firmware environment, sensor data produced by the plurality of sensors;
aggregating, by the sensor layer in the OS-absent firmware environment, the sensor data;
selectively providing, by the sensor layer, the sensor data or aggregated sensor data to one or more firmware modules via the interface of the sensor layer; and
selectively instantiating one or more drivers for one or more corresponding sensors of the plurality of sensors, based at least in part on a portion of sensor data or aggregated sensor data associated with one or more environmental factors.

12. The method of claim 11, wherein the one or more firmware modules include an environmental factor boot module and further comprising:
receiving, by the environmental factor boot module, the portion of sensor data or aggregated sensor data from the sensor layer through the interface of the sensor layer; and
applying, by the environmental factor boot module, one or more policies based at least in part on the portion of sensor data or aggregated sensor data, wherein the portion of sensor data or aggregated sensor data is associated with one or more environmental factors defined by the one or more policies.

13. The method of claim 11, wherein the one or more firmware modules include a sensor calibration module and further comprising:
validating, by the sensor calibration module, a sensor of the plurality of sensors based at least in part on the sensor data produced by the sensor; or
calibrating, by the sensor calibration module, a sensor of the plurality of sensors based at least in part on the sensor data produced by the sensor.

14. The method of claim 13, wherein validating a sensor of the plurality of sensors further comprises verifying to an operating system of the computing device the validity of the sensor data produced by the sensor.

15. The method of claim 13, wherein calibrating the sensor of the plurality of sensors further comprises:
interacting with the sensor layer to cause the sensor data produced by the sensor to match a reference value; or
manipulating the sensor data to cause the sensor data to match the reference value.

16. The method of claim 11, further comprising wherein the OS-absent firmware environment is a unified extensible firmware interface (UEFI) environment of a boot process.

17. The method of claim 16, wherein the OS-absent firmware environment is a driver execution environment (DXE) of the UEFI environment.

18. One or more non-transitory computer-readable media having a plurality of instructions stored thereon, the plurality of instructions, when executed by a processor of a computing device while the computing device is operating without an operating system (OS), to provide the computing device with a firmware environment that includes one or more modules, including an environmental factor boot module, and a single sensor layer, wherein the single sensor layer is to:
- receive sensor data produced by a plurality of sensors, wherein the plurality of sensors is of the computing device or operatively coupled with the computing device; and
- selectively provide the sensor data to the one or more modules via an interface of the single sensor layer that abstracts the plurality of sensors; and
- wherein the environmental factor boot module is to selectively instantiate one or more drivers for one or more corresponding sensors of the plurality of sensors, based at least in part on a portion of sensor data or aggregated sensor data associated with one or more environmental factors.

19. The computer-readable media of claim 18, wherein the one or more modules includes a data security module to:
- receive data to be encrypted;
- generate an encryption key based at least in part on sensor local information received from the single sensor layer;
- encrypt the data utilizing the encryption key; and
- persist the sensor local information in a memory of the computing device as encryption information.

20. The computer-readable media of claim 19, wherein the data security module is to further:
- receive a request to decrypt the data;
- receive additional sensor local information from the single sensor layer;
- retrieve the encryption information;
- generate a decryption key based at least in part on the additional sensor local information when the additional sensor local information matches the encryption information; and
- decrypt the data utilizing the decryption key.

21. The computer-readable media of claim 19, wherein the sensor local information includes one or more of sensor readings, sensor state, or sensor calibration.

22. The computer-readable media of claim 18, wherein the environmental factor boot module is to:
- receive the portion of sensor data from the single sensor layer through the interface of the single sensor layer; and
- apply one or more policies based at least in part on the portion of sensor data, wherein the portion of sensor data is associated with one or more environmental factors defined by the one or more policies.

23. The computer-readable media of claim 22, wherein to apply one or more policies is to terminate a boot process, of the computing device, when a determination is made that the one or more policies are violated, based at least in part on the portion of sensor data associated with the one or more environmental factors.

* * * * *